(12) United States Patent
Chang et al.

(10) Patent No.: US 8,187,562 B2
(45) Date of Patent: May 29, 2012

(54) METHOD FOR PRODUCING CERIUM DIOXIDE NANOPOWDER BY FLAME SPRAY PYROLYSIS AND CERIUM DIOXIDE NANOPOWDER PRODUCED BY THE METHOD

(75) Inventors: Han Kwon Chang, Daejeon (KR); Hee Dong Jang, Daejeon (KR); Dae Sup Kil, Daejeon (KR); Kuk Cho, Daejeon (KR); Sung-Wook Cho, Daejeon (KR)

(73) Assignee: Korea Institute of Geoscience and Mineral Resources (KIGAM), Daijeon (KR)

( * ) Notice: Subject to any disclaimer, the term of this patent is extended or adjusted under 35 U.S.C. 154(b) by 0 days.

(21) Appl. No.: 12/953,668

(22) Filed: Nov. 24, 2010

(65) Prior Publication Data
US 2011/0281112 A1    Nov. 17, 2011

(30) Foreign Application Priority Data

May 13, 2010    (KR) ........................ 10-2010-0044938

(51) Int. Cl.
*C01F 17/00*    (2006.01)
(52) U.S. Cl. ...................................... 423/263; 977/775
(58) Field of Classification Search ................. 423/21.1, 423/263; 977/775
See application file for complete search history.

(56) References Cited

U.S. PATENT DOCUMENTS

| 6,887,566 | B1 * | 5/2005 | Hung et al. | 428/357 |
| 2005/0036928 | A1 * | 2/2005 | Katusic et al. | 423/263 |

FOREIGN PATENT DOCUMENTS

| JP | 2007-154155 | * | 6/2007 |
| WO | 2008/030815 | * | 3/2008 |

* cited by examiner

*Primary Examiner* — Steven Bos
(74) *Attorney, Agent, or Firm* — Birch, Stewart, Kolasch & Birch, LLP

(57) ABSTRACT

Disclosed is a method for producing a cerium dioxide nanopowder by flame spray pyrolysis. The method comprises dissolving a cerium compound in an organic solvent to prepare a precursor solution, atomizing the precursor solution into microdroplets using an ultrasonic atomizer, transferring the microdroplets together with an argon gas as a carrier gas to a central portion of a high-temperature diffusion flame burner, subjecting the microdroplets to pyrolysis and oxidation in the central portion of the diffusion flame burner to produce a cerium dioxide nanopowder, and collecting the cerium dioxide nanopowder using a collector. According to the method, a cerium dioxide nanopowder can be continuously produced on a large scale by flame spray pyrolysis. In addition, the particle size and uniformity of the cerium dioxide nanopowder can be controlled by appropriately selecting the kind of the solvent and the concentration of the raw material. Furthermore, flame spray pyrolysis allows the cerium dioxide to have a fluorite crystal structure.

4 Claims, 4 Drawing Sheets

METHOD FOR PRODUCING CERIUM DIOXIDE NANOPOWDER BY FLAME SPRAY PYROLYSIS AND CERIUM DIOXIDE NANOPOWDER PRODUCED BY THE METHOD

BACKGROUND OF THE INVENTION

1. Field of the Invention

The present invention relates to a method for producing cerium dioxide ($CeO_2$) nanopowder by flame spray pyrolysis and a cerium dioxide nanopowder produced by the method. More specifically, the present invention relates to: a method for producing a cerium dioxide nanopowder by flame spray pyrolysis, which is a dry process for the large-scale production of high-purity composite powders in a continuous manner, wherein the concentration of a raw material and the kind of a solvent are suitably selected to allow the cerium dioxide nanopowder to have a uniform particle size distribution and a small particle size, and a cerium dioxide nanopowder produced by the method.

2. Description of the Related Art

Cerium dioxide, also called ceria or cerium oxide, has a cubic crystal structure and is one of the most applicable and attractive rare earth metal oxides. Cerium dioxide can be utilized in various industrial fields, including fuel cells, insulators, UV screening agents as high refractive index materials, abrasives, gas sensors, high-temperature and oxidation resistant materials, etc. In addition, cerium dioxide is used as a ternary catalyst of an automotive muffler, a catalytic activator or a catalyst support.

The performance of cerium dioxide as a catalyst is dependent on its size. Nanometer sized cerium dioxide is expected to have effects, such as shift of Raman-allowed modes, lattice expansion, blue shift of UV absorption spectra, increased electronic conductivity and fast oxidation rate of carbon monoxide.

Numerous methods have been attempted to produce ceria nanopowders, for example, hydrothermal synthesis, precipitation, solid-phase combustion, mechano chemical processing, sol-gel processing, gas condensation, and high-frequency heating.

Although gas-phase synthesis is known to be economically advantageous in the production of nanoparticles, it fails to control the size of nanoparticles and have great difficulty in the production of multi-component materials other than one-component materials. For these reasons, gas-phase synthesis is currently utilized to produce low-priced nanoparticles rather than to produce high value-added ceramic nanoparticles despite its cost advantage. It is widely known that liquid-phase synthesis enables the production of spherical nanoparticles in a size-controllable manner. Liquid-phase synthesis can be utilized in many applications, but it incurs considerable production costs. Since subsequent heat treatment is essentially involved in the production of ceramic particles by liquid-phase synthesis, the problems of powder aggregation and increased particle size are inevitable, leaving room for improvement.

In the case of conventional methods for producing nanoparticles of cerium dioxide by flame spray pyrolysis, suitable solvents, such as distilled water, are used to dissolve raw materials. In this case, the use of water makes the cerium dioxide particles non-uniform in size distribution and as large as 20 nm in size.

Under these circumstances, there is a need to develop a technique for producing nanoparticles of cerium dioxide with a uniform size distribution.

SUMMARY OF THE INVENTION

The present invention has been made in an effort to solve the above-mentioned problems, and it is an object of the present invention to provide a method for continuously producing a cerium dioxide nanopowder on a large scale by flame spray pyrolysis.

It is another object of the present invention to provide a method for producing a cerium dioxide nanopowder whose particle size and uniformity can be controlled by appropriately selecting the kind of a solvent and the concentration of a raw material.

It is another object of the present invention to provide a method for producing cerium dioxide having a fluorite crystal structure by flame spray pyrolysis.

According to an aspect of the present invention, there is provided a method for producing a cerium dioxide nanopowder by flame spray pyrolysis, the method comprising dissolving a cerium compound in an organic solvent to prepare a precursor solution, atomizing the precursor solution into microdroplets using an ultrasonic atomizer, transferring the microdroplets together with a carrier gas to a central portion of a high-temperature diffusion flame burner, subjecting the microdroplets to pyrolysis and oxidation in the central portion of the diffusion flame burner to produce a cerium dioxide nanopowder, and collecting the cerium dioxide nanopowder using a collector.

In an embodiment, the cerium compound is cerium nitrate, cerium chloride, cerium sulfate, cerium acetate, cerium carbonate, or a mixture thereof.

In an embodiment, the organic solvent is methanol, ethanol, acetone, or a mixture thereof.

In an embodiment, the precursor solution is a 0.01 M to 0.1 M ethanol solution of cerium nitrate.

In an embodiment, the precursor solution is a 0.01 M to 0.1 M acetone solution of cerium nitrate.

In an embodiment, the high-temperature diffusion flame burner includes five concentric stainless tubes consisting of: an innermost tube through which the carrier gas and the microdroplets are fed; first, second and third intermediate tubes, sequentially surrounding the innermost tube, through which argon, hydrogen and oxygen gases are fed, respectively; and an outermost tube through which air is fed.

In an embodiment, the carrier gas is an argon gas, a nitrogen gas, an oxygen gas, air, or a mixed gas thereof.

In an embodiment, the nanopowder is collected by thermophoresis or using a filter, a cyclone, an electric collector or a combination thereof.

According to another aspect of the present invention, there is provided a cerium dioxide nanopowder, whose particle size is from 4 nm to 20 nm, produced by the method.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention provides a method for producing a cerium dioxide nanopowder by flame spray pyrolysis. Specifically, the method of the present invention comprises dissolving a cerium compound in an organic solvent to prepare a precursor solution, atomizing the precursor solution into microdroplets using an ultrasonic atomizer, transferring the microdroplets together with a carrier gas to a central portion of a high-temperature diffusion flame burner, subjecting the microdroplets to pyrolysis and oxidation in the central portion of the diffusion flame burner to produce a cerium dioxide nanopowder, and collecting the cerium dioxide nanopowder using a collector.

The present invention will now be described in detail with reference to the accompanying drawings.

The method of the present invention adopts flame spray pyrolysis, which is a dry process advantageous for the large-scale production of high-purity composite powders in a continuous manner, to produce a cerium dioxide nanopowder. In addition, the particle size uniformity and crystallite size of the nanopowder are controlled by appropriately selecting the concentration of the solution of the raw material and the kind of the solvent.

The cerium compound used as the raw material may be cerium nitrate, cerium chloride, cerium sulfate, cerium acetate, cerium carbonate, or a mixture thereof.

As the organic solvent, there can be used methanol, ethanol, acetone, or a mixture thereof.

Water has been used as a solvent in conventional methods for the production of cerium dioxide nanopowders. In contrast, the method of the present invention uses the organic solvent for better uniformity of the final cerium dioxide nanopowder. The reason for the use of the organic solvent instead of water is that the organic solvent has a lower surface tension than water.

Figure 1:
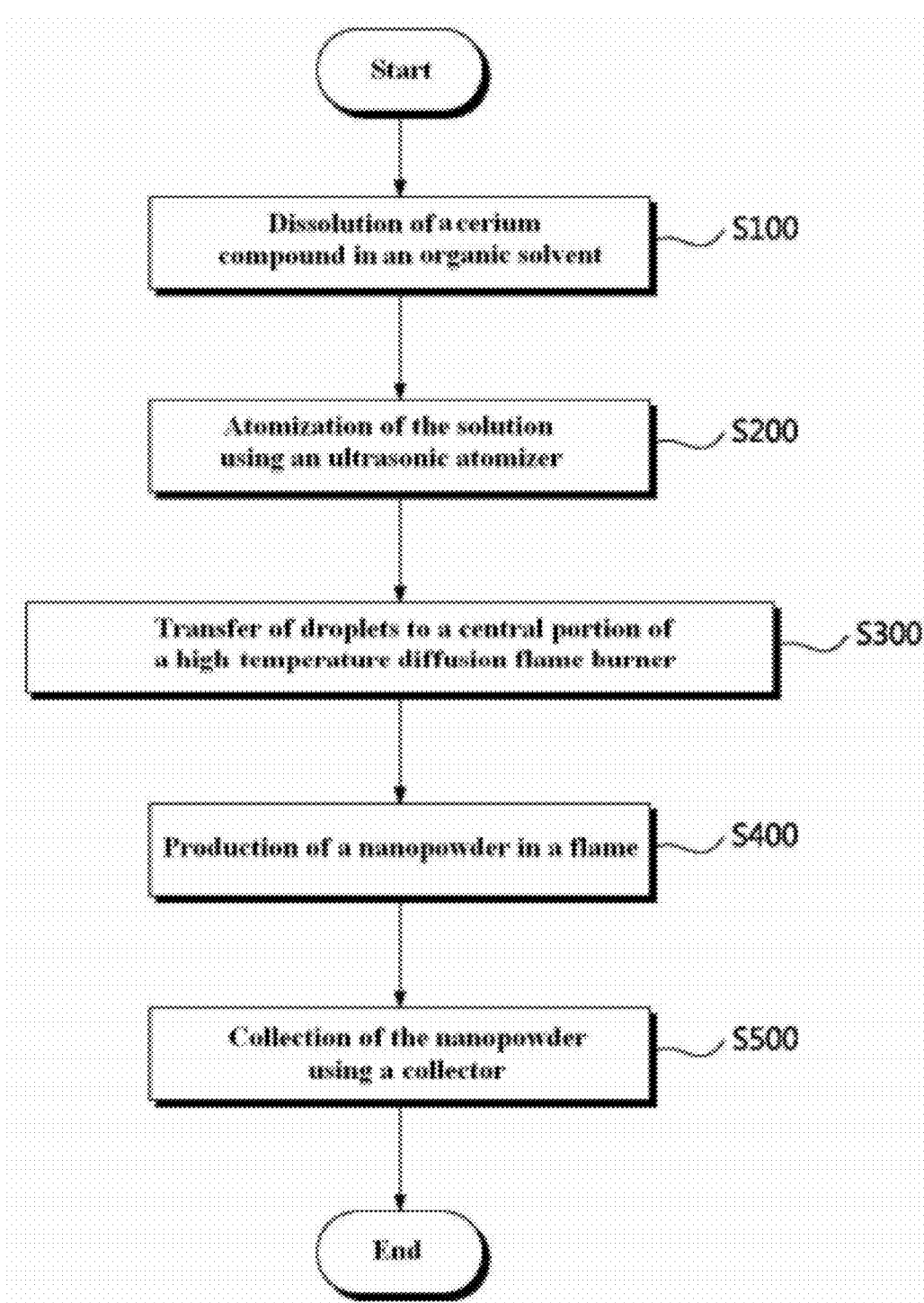
FIG. 1 is a flow chart illustrating a method for producing a cerium dioxide powder according to the present invention.
Figure 2:
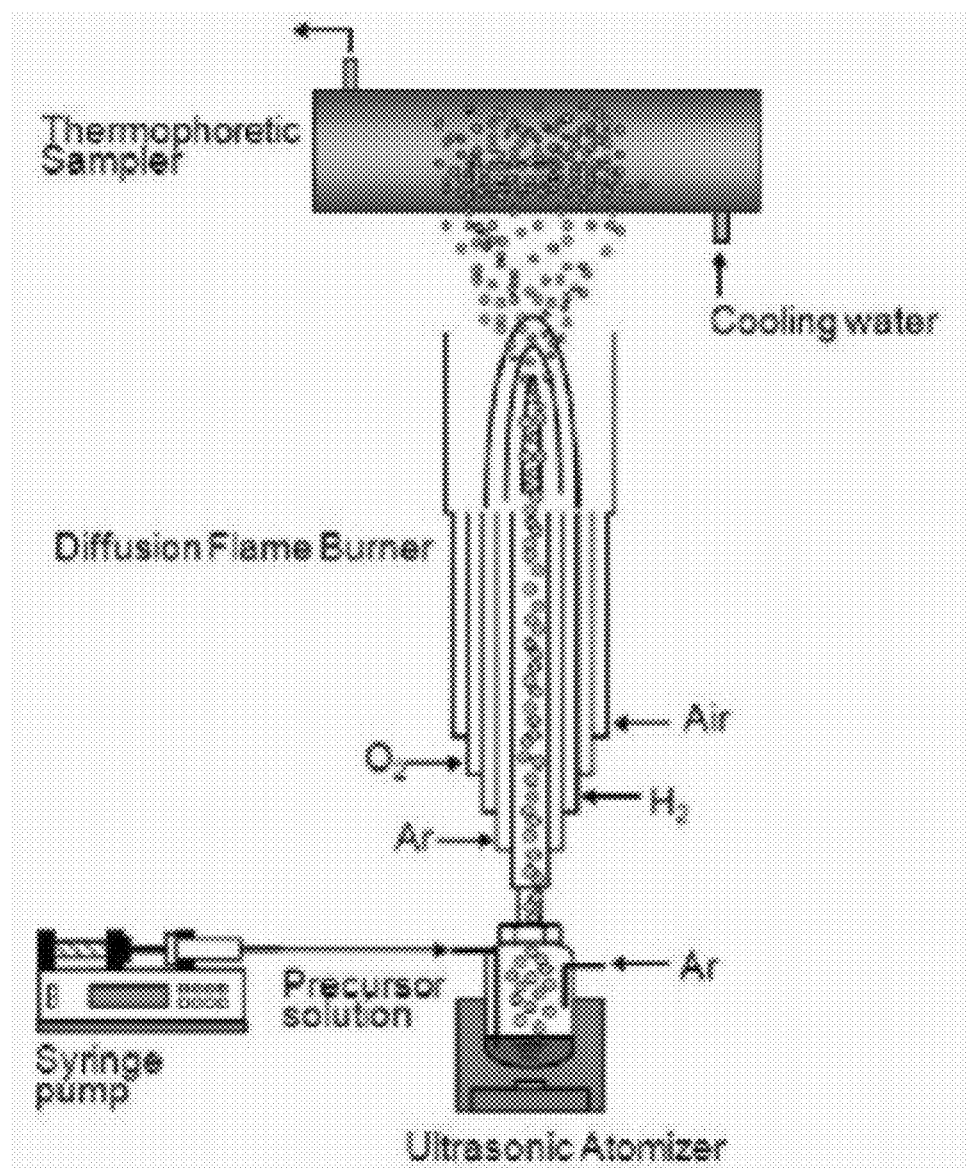
FIG. 2 is a view illustrating a flame spray pyrolysis apparatus for the synthesis of a cerium dioxide nanopowder.

FIG. 1 is a flow chart illustrating the method of the present invention, and FIG. 2 is a view schematically illustrating a flame spray pyrolysis apparatus used in the method of the present invention.

(a) Step of Dissolving a Cerium Compound in Methanol, Ethanol, Acetone or a Mixture Thereof to Prepare a Precursor Solution (S100)

Hereinafter, cerium nitrate will be mentioned as a raw material for cerium dioxide. In this step, cerium nitrate is dissolved in a solvent to prepare a precursor solution. The method of the present invention is characterized by the use of the solvent enabling the production of a cerium dioxide nanopowder having a uniform particle size distribution and an ultrafine particle size of around 10 nm.

In the case where ethanol is used as the solvent, it is preferred that the cerium nitrate is present at a concentration of 0.01 M to 0.1 M. In this case, the crystallite size of the final cerium dioxide nanopowder can be adjusted within the range of about 4 nm to about 8 nm. The presence of the cerium nitrate at a concentration of less than 0.01 M considerably lowers the yield of the cerium dioxide nanopowder, which is unfavorable in terms of economic efficiency. Meanwhile, the presence of the cerium nitrate at a concentration exceeding 0.1 M makes it difficult to use an ultrasonic atomizer for atomizing the precursor solution into microdroplets in the subsequent step.

In the case where acetone is used as the solvent, it is preferred that the cerium nitrate is present at a concentration of 0.01 M to 0.1 M. In this case, the crystallite size of the final cerium dioxide nanopowder can be adjusted within the range of about 10 nm to about 20 nm. The presence of the cerium nitrate at a concentration of less than 0.01 M considerably lowers the yield of the cerium dioxide nanopowder, which is unfavorable in terms of economic efficiency. Meanwhile, the presence of the cerium nitrate at a concentration exceeding 0.1 M makes it difficult to use an ultrasonic atomizer for atomizing the precursor solution into microdroplets in the subsequent step.

(b) Atomization of the Precursor Solution into Microdroplets Using an Ultrasonic Atomizer (S200)

In this step, the precursor solution of the cerium compound in the solvent is injected into an ultrasonic atomizer where it is atomized into microdroplets. A syringe pump may be employed to maintain the amount of the precursor solution atomized constant. Instead of the ultrasonic atomizer, a nozzle may be used to atomize the precursor solution.

(c) Transfer of the Microdroplets Together with a Carrier Gas to a Central Portion of a High-Temperature Diffusion Flame Burner (S300)

In this step, a carrier gas is used to transfer the microdroplets atomized in S200 to a central portion of a high-temperature diffusion flame burner.

As the carrier gas, there can be used an argon gas, a nitrogen gas, an oxygen gas, air, or a mixed gas thereof.

(d) Pyrolysis and Oxidation of the Microdroplets while Staying in the Central Portion of the Diffusion Flame Burner to Produce a Nanopowder (S400)

In this step, the microdroplets converted from the precursor solution of the cerium compound are forcibly transferred by the carrier gas to stay in the hot flame for a certain time. The microdroplets are pyrolyzed and oxidized into a nanopowder. An exemplary structure of the diffusion flame burner is illustrated in FIG. 2. As illustrated in FIG. 2, the diffusion flame burner includes five concentric stainless tubes consisting of an innermost tube, first, second and third intermediate tubes sequentially surrounding the innermost tube, and an outermost tube. The carrier gas and the microdroplets can be fed through the innermost tube. Argon, hydrogen and oxygen gases can be fed through the first, second and third intermediate tubes, respectively. Air can be fed through the outermost tube. The gases are fed simultaneously to create the flame.

(e) Collection of the Nanopowder Using a Collector (S500)

In this step, the nanopowder is collected using a collector. When it is intended to collect the nanopowder by thermophoresis, it is preferred to position the collector above the burner and allow cooling water to flow through an inner tube of the collector to maintain the temperature of the collector constant. Alternatively, a filter, a cyclone, an electrostatic collector or a combination thereof may be used to collect the nanopowder.

The present invention will be explained with reference to the following examples. However, these examples serve to provide further appreciation of the invention but are not meant in any way to restrict the scope of the invention.

EXAMPLES

Example 1

Cerium nitrate ($Ce(NO_3)_3 \cdot H_2O$, Aldrich, 99%) was dissolved in ethanol to prepare a precursor solution having a concentration of 0.01 M.

After the precursor solution was injected into an ultrasonic atomizer (Nescosonic UN-15, Alfresa, frequency=1.60~1.72 MHz) through a syringe pump, it was atomized into micrometer-sized droplets. The droplets were transferred together with an argon gas (Ar, 99.95%) as a carrier gas to a central portion of a diffusion flame burner (outer diameter=36 mm, length=300 mm) including five concentric stainless tubes. The concentric stainless tubes consist of an innermost tube, first, second and third intermediate tubes sequentially surrounding the innermost tube, and an outermost tube. The mixture of droplets and the carrier gas were fed through the innermost tube. The flow rate of the carrier gas was fixed to 2 l/min. An argon gas was fed at a fixed flow rate of 1 l/min through the first intermediate tube, a hydrogen gas ($H_2$, 99.995%) was fed at a fixed flow rate of 5 l/min through the second intermediate tube, and an oxygen gas ($O_2$, 99.95%) was fed at a fixed flow rate of 6 l/min through the third intermediate tube, and air was fed at a fixed flow rate of 15 l/min through the outermost tube. The temperature at the central region of flame, where the precursor droplets passed through, was ranged from 1300° C. to 900° C. A stainless tube having an inner diameter of 38 mm and a length of 100 mm was installed on the burner to protect a stable combustion environment from the ambient air flow.

The transferred droplets were pyrolyzed and oxidized into a nanopowder by flame in the central portion of the diffusion flame burner. The nanopowder was attached to a glass-made thermophoretic sampler (diameter=100 mm, length=300 mm) located 150 mm from the top of the diffusion flame burner. Cooling water was allowed to flow through an inner tube of the sampler to maintain the temperature of the sampler at 12° C.

Example 2

A cerium dioxide nanopowder was produced in the same manner as in Example 1, except that the concentration of cerium nitrate ($Ce(NO_3)_3 \cdot H_2O$, Aldrich, 99%) in ethanol was changed to 0.05 M.

Example 3

A cerium dioxide nanopowder was produced in the same manner as in Example 1, except that the concentration of cerium nitrate ($Ce(NO_3)_3 \cdot H_2O$, Aldrich, 99%) in ethanol was changed to 0.1 M.

Example 4

A cerium dioxide nanopowder was produced in the same manner as in Example 1, except that a 0.05 M acetone solution of cerium nitrate ($Ce(NO_3)_3 \cdot H_2O$, Aldrich, 99%) was used as the precursor solution.

Example 5

A cerium dioxide nanopowder was produced in the same manner as in Example 4, except that the concentration of the acetone solution was changed to 0.1 M.

Comparative Example 1

A cerium dioxide nanopowder was produced in the same manner as in Example 1, except that distilled water was used instead of ethanol.

Evaluation of Characteristics of Powders

The shapes of the powders produced in Examples 1-5 and Comparative Example 1 were observed at an applied voltage of 120 kV using a transmission electron microscope (TEM, CM12, Philips). The crystal phases of the powders were analyzed at 2θ angles of 10° to 80° using an X-ray diffraction (XRD) analyzer (RTP 300 RC, Rigaku) (CuKa target, 40 kV, 30 mA). The crystallite sizes (D) were calculated by the Scherrer's equation: $D = k\lambda / \beta \cos \theta$ (where k is the shape factor equal to 0.9, λ is the x-ray wavelength, β is the full width at half maximum of the diffraction curve, and θ is the diffraction angle).

RESULTS

Figure 3:
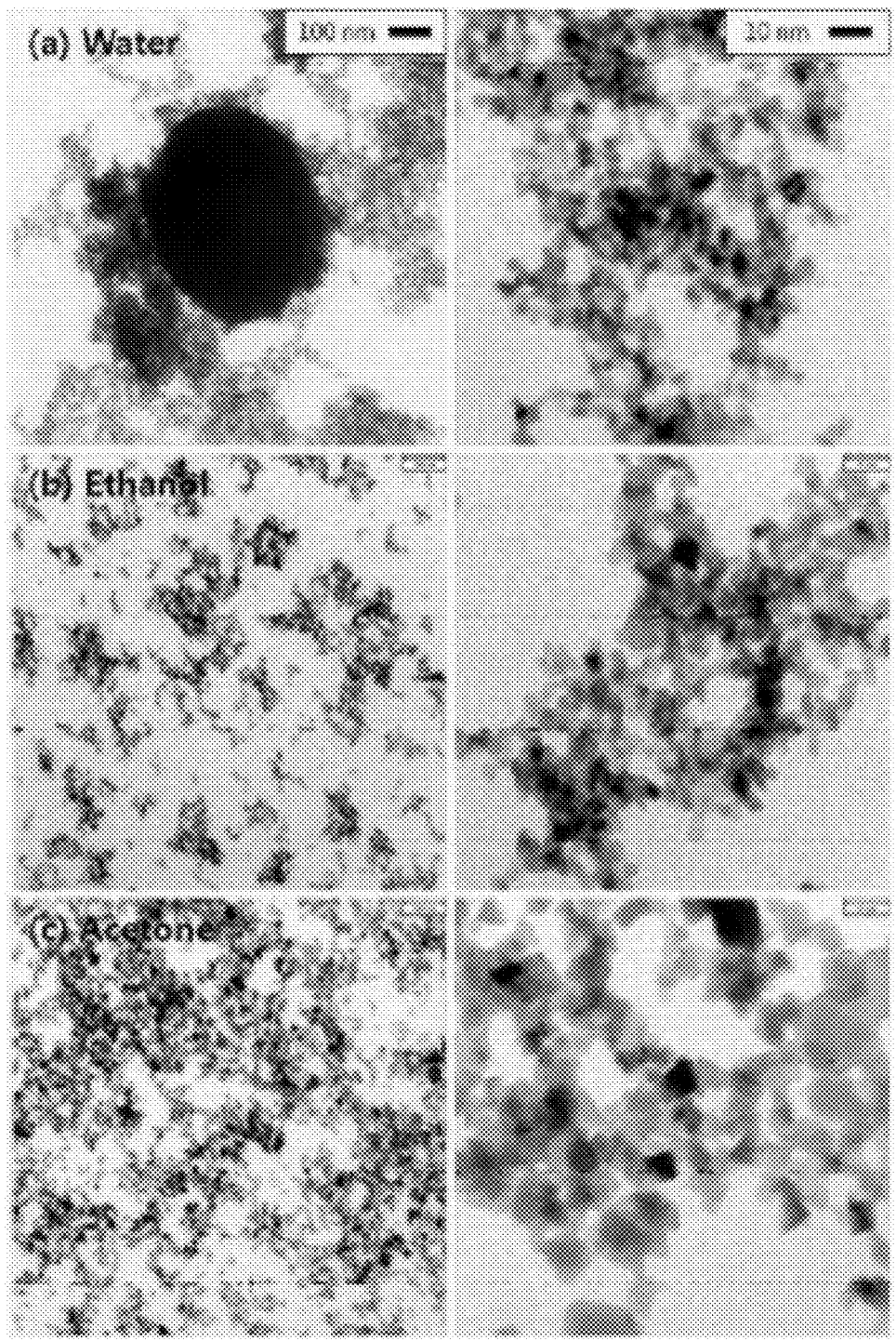
FIG. 3 shows transmission electron microscope (TEM) images of cerium dioxide nanopowders synthesized from precursor solutions of the same raw material in different solvents by flame spray pyrolysis.

In Comparative Example 1, Example 2 and Example 4, the $CeO_2$ nanopowders were produced from the precursor solutions of cerium nitrate at the fixed concentration (0.05 M) in the different solvents by flame spray pyrolysis. FIG. 3 shows TEM images of the $CeO_2$ nanopowders ((a): Comparative Example 1, (b): Example 2 and (c) Example 4). The $CeO_2$ powders whose particles are cubic in shape were successfully synthesized. The powders produced in Examples 2 and 4 were very uniform in size. Relatively large ($\geq$400 nm in size) and non-uniform particles were present in the nanopowder produced in Comparative Example 1. These results reveal that the use of ethanol and acetone having a lower surface tension than water is advantageous in the synthesis of more uniform $CeO_2$ nanopowders.

Figure 4:
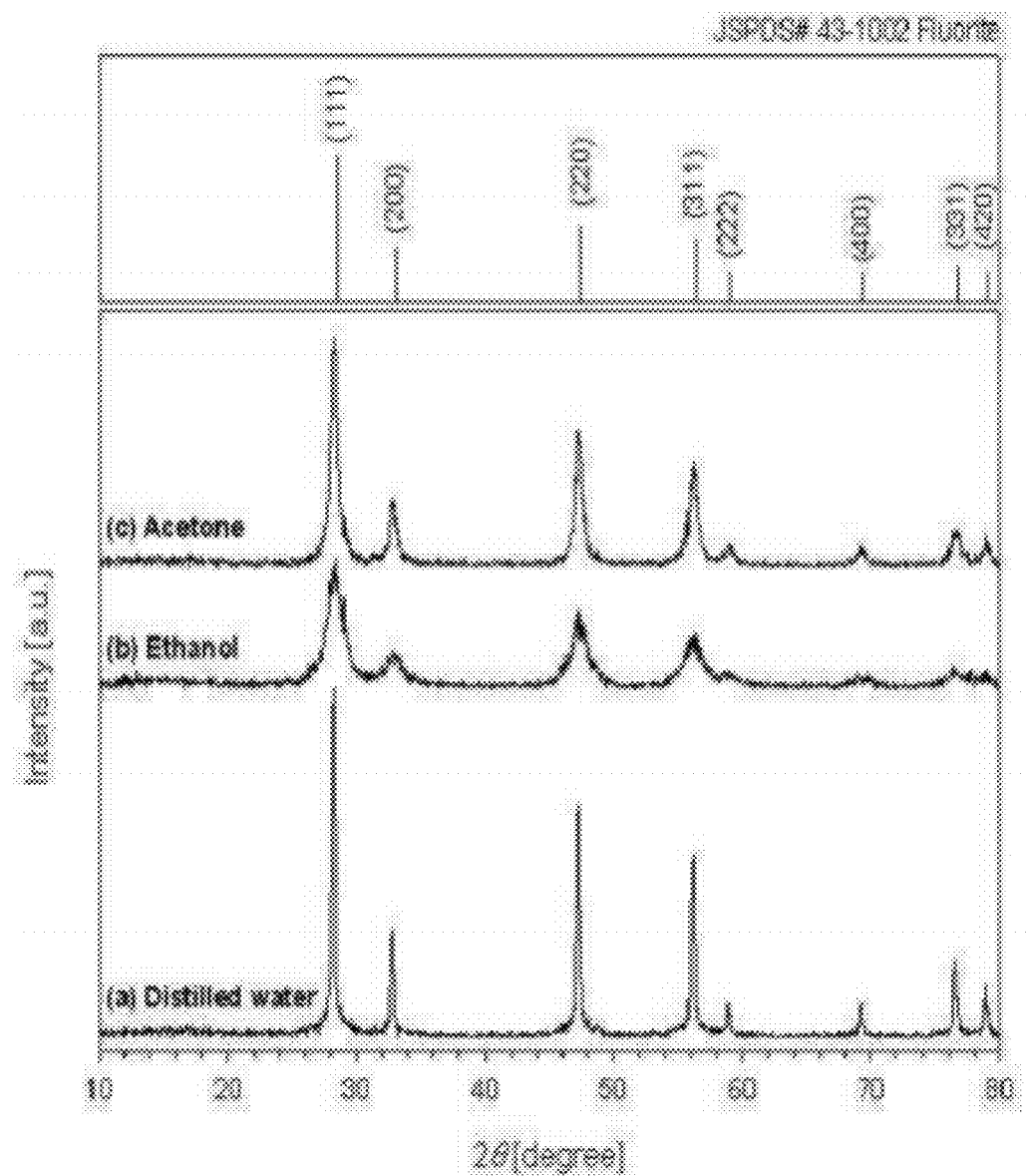
FIG. 4 shows X-ray diffraction spectra of cerium dioxide nanopowders synthesized from precursor solutions of the same raw material in different solvents by flame spray pyrolysis.

FIG. 4 shows XRD spectra of the $CeO_2$ nanopowders produced from the precursor solutions of cerium nitrate at the fixed concentration (0.05 M) in the different solvents ((a): Comparative Example 1, (b): Example 2 and (c) Example 4). Irrespective of the kind of the solvents, all nanopowders were confirmed to have a fluorite crystal structure. These results demonstrate that flame spray pyrolysis enables the production of crystalline $CeO_2$ nanopowders.

The crystallite sizes of the cerium dioxide nanopowders produced in Examples 1-5 were calculated by the Scherrer's equation. The results are shown in Table 1.

Depending on the concentration of the cerium nitrate used, the crystallite sizes of the $CeO_2$ nanopowders could be controlled within the range of 4.4 nm to 7.9 nm when ethanol was used as the solvent (Examples 1-3) and could be controlled within the range of 12.6 nm to 19.0 nm when acetone was used as the solvent (Examples 4-5).

TABLE 1

| | Concentration of Solvents (M) | | |
|---|---|---|---|
| | Ethanol | Acetone | Crystallite size (nm) |
| Example 1 | 0.01 | — | 4.4 |
| Example 2 | 0.05 | — | 6.6 |
| Example 3 | 0.1 | — | 7.9 |
| Example 4 | — | 0.05 | 12.6 |
| Example 5 | — | 0.1 | 19.0 |

As is apparent from the foregoing, according to the method of the present invention, a cerium dioxide nanopowder can be continuously produced on a large scale by flame spray pyrolysis. In addition, the crystallite size and uniformity of the cerium dioxide nanopowder can be controlled by appropriately selecting the kind of the solvent and the concentration of the raw material. Furthermore, flame spray pyrolysis allows the cerium dioxide to have a fluorite crystal structure.

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

What is claimed is:

1. A method for producing a cerium dioxide nanopowder by flame spray pyrolysis, comprising
   dissolving a sufficient amount of cerium nitrate in acetone to prepare a precursor solution having 0.01 M to 0.1 M cerium nitrate,
   atomizing the precursor solution into microdroplets with an ultrasonic atomizer,
   transferring the microdroplets together with a carrier gas to a central portion of a high-temperature diffusion flame burner,
   subjecting the microdroplets to pyrolysis and oxidation in the central portion of the diffusion flame burner to produce a cerium dioxide nanopowder, and
   collecting the cerium dioxide nanopowder with a collector.

2. The method of claim 1, wherein the high-temperature diffusion flame burner includes five concentric stainless tubes consisting of: an innermost tube through which the carrier gas and the microdroplets are fed; first, second and third intermediate tubes, sequentially surrounding the innermost tube, through which argon, hydrogen and oxygen gases are fed, respectively; and an outermost tube through which air is fed.

3. The method of claim 1, wherein the carrier gas is an argon gas, a nitrogen gas, an oxygen gas, air, or a mixed gas thereof.

4. The method of claim 1, wherein the nanopowder is collected by thermophoresis or with a filter, a cyclone, an electrostatic collector or a combination thereof.

* * * * *